Feb. 18, 1936.    H. W. LORMOR    2,031,378
BATTERY TERMINAL POST
Filed Feb. 14, 1933
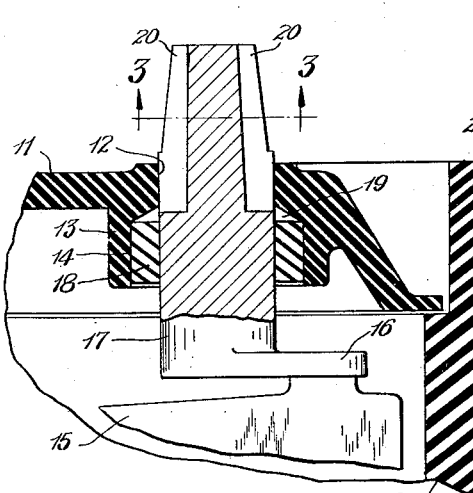
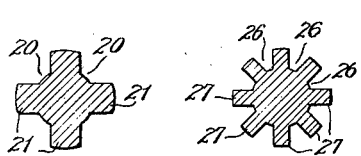
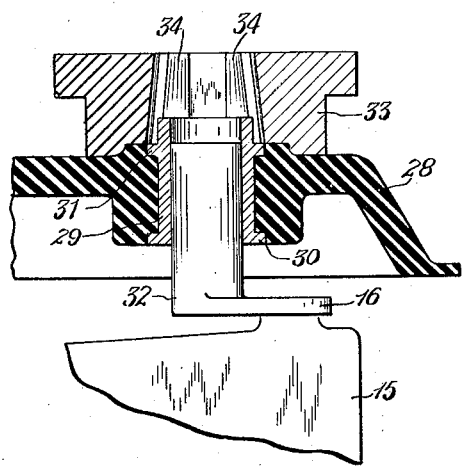
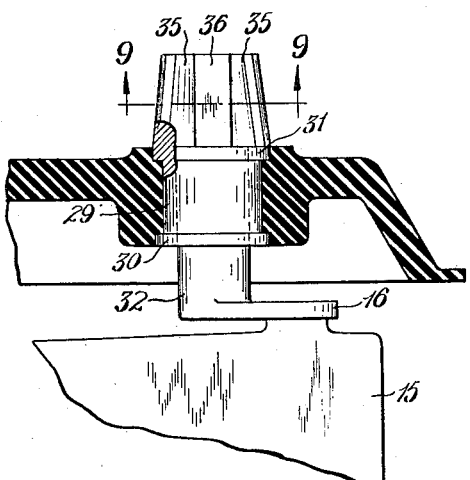
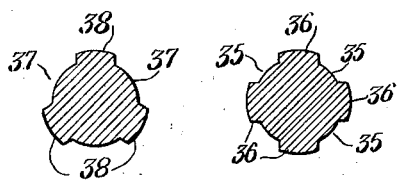
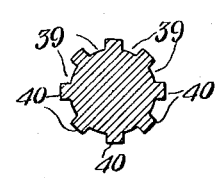
INVENTOR:
HENRY W. LORMOR
Kwis. Hudson & Kent
ATTORNEYS Patented Feb. 18, 1936

2,031,378

UNITED STATES PATENT OFFICE 2,031,378

BATTERY TERMINAL POST

Henry W. Lormor, Cleveland Heights, Ohio, assignor to Willard Storage Battery Company, Cleveland, Ohio, a corporation of West Virginia Application February 14, 1933, Serial No. 656,727

4 Claims. (Cl. 136—168)

This invention relates to improvements in battery terminal posts, and has reference especially to provisions for carrying or storing grease, by means of which the corrosion of the cable terminals by electrolyte vapor, spray or other leakage from the battery is avoided or reduced to a minimum. The post itself is made of lead or lead alloy, which is highly resistant to corrosion. The cable connector or terminal however is made of some stronger material, as for instance brass lead-plated, and accordingly should be protected against corrosion.

I am aware that it has been proposed to form battery terminal posts with annular or spiral grooves for retaining grease, but there are certain advantages resulting from my invention which cannot be obtained by the use of such horizontal or substantially horizontal grooves. In the first place, the molding into the posts of horizontal or spiral grooves calls for special mold parts which may be collapsed in order to permit the removal of the posts from the mold, and that renders the making of the posts expensive. In the second place, the surface of such a post constitutes a less satisfactory and stable seat for the connector, and such a post will wear faster from the removal and replacement of clamp connectors, as occurs frequently in some cases, for instance in batteries employed in rental service. In the third place, when a post is grooved horizontally the post section is reduced at that point very materially, and the strength of the post correspondingly lessened.

By the use of grooves arranged lengthwise of the posts, that is grooves in or symmetrical with planes through the axis of the post, the cost of manufacture of the posts is not materially increased, for they may be cast in a simple mold and drawn out of the mold readily. Furthermore the longitudinal grooves leave intermediate continuous longitudinal surfaces, with which the connector may contact and by which it is guided into place when the connector is mounted upon the post. The vertical ribs provided upon the post by my invention insure a firm solid contact area for the cable connector which is a prime requisite, as the contact surface of an ungrooved post is made larger than would be necessary for electrical purposes in order to provide mechanical stability. Also the vertical grooves do not reduce the cross section of the post to anything like the extent to which horizontal grooves reduce it, and hence the post remains strong and stable.

One of the objects of the invention therefore is the provision of a new type of grease grooves in storage battery terminal posts.

Another object is the provision of a grooved post which may be manufactured in a simple and inexpensive manner.

A third object is the provision of a mechanically strong post, by the use of which however a saving in material may be effected.

Still another object is the provision of a post having vertical grooves for grease, which communicate with an annular pocket also adapted to hold grease, and from which the supply of grease in the grooves may be augmented when the grease expands due to heat.

Other objects and features of novelty will appear as I proceed with the description of those embodiments of the invention which, for the purposes of the present application, I have illustrated in the accompanying drawing, in which Figure 1 is a fragmental view, principally in vertical section, of a storage battery container and cover, and a portion of a battery element with a terminal post extending therefrom upwardly through an opening in the cover.

Figs. 2, 3, 4 and 5 are cross sectional views of posts variously grooved in accordance with my invention, Fig. 3 being taken substantially on the line 3—3 of Fig. 1, and the other figures being corresponding sections of modifications.

Fig. 6 is a vertical sectional view of a fragment of a storage battery in process of assembly, in which the terminal is built up from a small post and an insert in the cover, showing a post builder in position ready to receive the molten metal for building the upper portion of the post.

Fig. 7 is a similar view with the post completed and the post builder removed.

Figs. 8, 9 and 10 are cross sections of the exposed part of a post of the nature of that shown in Fig. 7, illustrating grooves of different numbers and spacing, Fig. 9 being a section taken substantially on the line 9—9 of Fig. 7.

Referring first to those embodiments of the invention which are illustrated in Figs. 1 to 5 inclusive, the battery container or jar is indicated at 10, being provided with a cover 11 through which there is a terminal post opening 12. 13 is a cylindrical skirt depending from the cover concentric with the opening 12, and providing a chamber 14. A fragment of the battery element is shown at 15. It comprises a strap 16 connecting together the plates of one polarity, and from this strap there rises a terminal post 17 which fits rather snugly in the opening 12. The space between the solid lower part of the post 17 and the skirt 13 is filled and sealed with a gasket 18, preferably of soft rubber, but above the gasket there is left an annular pocket 19.

The upper end of the post 17 is formed, by casting or otherwise, with a plurality of longitudinally extending slots or grooves 20, which extend downwardly at least as far as the upper surface of the cover 11, but preferably downward through the cover and slightly therebelow so as to communicate with the annular pocket 19. The walls of these grooves are so formed as to provide sufficient draft to enable the post to be cast in a simple mold and withdrawn therefrom. The inner wall of each groove is therefore inclined inwardly and upwardly to a slight extent, as indicated in Fig. 1, and the side walls of the ribs 21 may be inclined toward each other as they approach the top of the post, or they may be parallel and the taper of the inner walls of the grooves relied upon to produce the necessary draft, since the direction of withdrawal will then be at a slight angle to the base of each groove.

In Fig. 2 I have shown a section of a post having three grooves 22 and three ribs 23, the post being identical with that of Fig. 1 in other respects. In Fig. 4 the post is shown formed with six grooves and ribs 24 and 25 respectively, while in Fig. 5 there are eight grooves and ribs 26 and 27 respectively.

In the form of the invention illustrated in Fig. 6, the cover 28 has molded into it a metal sleeve 29 provided with a lower and an upper flange 30 and 31 respectively, which flanges are flush with the lower and upper surfaces of the cover at the thickened portion or boss provided for the terminal post opening. The sleeve 29 extends upwardly somewhat beyond the cover, as clearly indicated in Fig. 6. In this form of the invention the strap 16 of the battery element 15 carries a solid terminal post 32 of smaller size than the post 17 and adapted to fit snugly within the sleeve 29. This post extends upwardly to a position approximately flush with the upper surface of the cover. When the parts are thus assembled, a post builder 33 is placed upon the top of the cover, properly centered with respect to the sleeve 29. The inner wall of the cavity in this post builder is provided with ribs 34. The post metal is then melted and dropped into the cavity of the post builder, uniting with the previously formed post 32 and with the upper end of sleeve 29. When the built up post is solidified the post builder 33 may be removed, leaving the structure illustrated in Figs. 7, in which there is an upper exposed part of the post which tapers upwardly from the flange 31 and has in it a series of longitudinally extending grooves 35 and ribs 36. The necessary draft may be provided in either of the ways described above as to Fig. 1.

Fig. 9 shows a section of the post of Fig. 7, while Fig. 8 shows a corresponding section of a modification in which there are three grooves 37 and three ribs 38, and Fig. 10 shows a modification in which there are eight grooves and ribs 39 and 40 respectively. In other respects the posts in Figs. 8 and 10 are identical with that of Fig. 7.

In the use of the invention in any of its forms, the grooves are filled with vaseline or other grease before the connector is applied to the post. In that form of the invention illustrated in Fig. 1, grease may be placed in the pocket 19 before the post is caused to project through the gasket 18 and the opening 12. There is then a supply of grease in communication with the grooves 20 of the post. After the battery is in service in an automobile, heat of the battery or engine, or heat resulting merely from hot weather, will cause the grease to expand and some of it to flow upwardly out of the grooves onto the connector surrounding the post, thereby assisting further in the retardation of corrosion. The extent to which this action may occur is increased in the modification of my invention shown in Fig. 1, because of the additional grease supply in the pocket 19.

Variations from the described structure may be employed. Accordingly I desire it to be understood that the scope of the invention is to be regarded as defined exclusively by the appended claims rather than by the foregoing description or accompanying illustration.

Having thus described my invention, I claim:

1. In an electric storage battery, a container, a cover therefor having an opening therethrough and having an enlarged circular chamber axially positioned below said opening, a battery element comprising a terminal post, said post extending upwardly through said chamber and opening, and having a plurality of grease grooves in its outer surface arranged lengthwise of the post, said grooves extending downwardly far enough to communicate with said chamber, and a sealing gasket bridging the space between the post and the chamber wall below the level of said grooves.

2. A terminal post for storage batteries, having symmetrically arranged longitudinal ribs for contact with a connector, said post being tapered toward the top and having channel-shaped grease grooves interposed between said ribs, the inner walls of said grooves being inclined inwardly and tapered toward the top and the side walls of said grooves flaring outwardly, whereby the grooves may be formed by a simple molding operation.

3. A terminal post for storage batteries, having alternate longitudinal ribs and grease grooves, the outer surface of the post being tapered, said ribs being of the same width from the top of the post down to the cover line, and said grooves gradually increasing in width from the top of the post down to the cover line.

4. A terminal post for storage batteries, having alternate longitudinal ribs and grease grooves, the outer surface of the post being tapered, said ribs being of the same width throughout their length, and said grooves gradually increasing in width from the top of the post downward.

HENRY W. LORMOR.